INVENTOR.
KURT KRONENBERGER
BY
Wolf, Greenfield + Hieken
ATTORNEYS

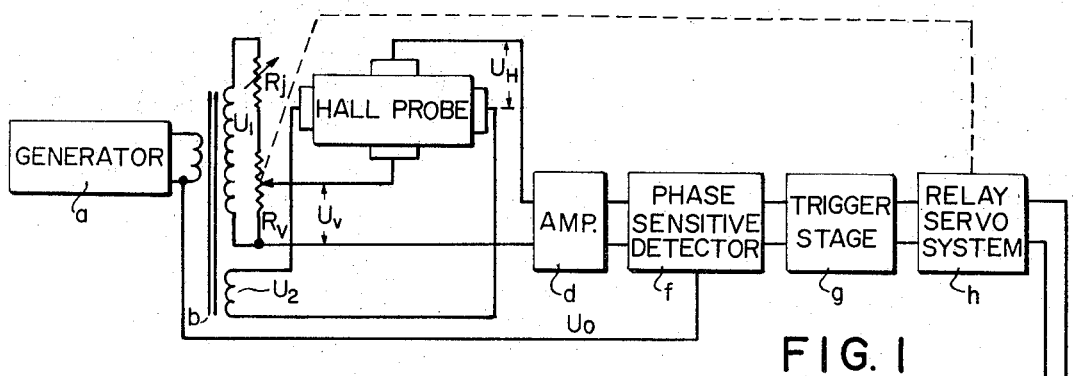
FIG. 1
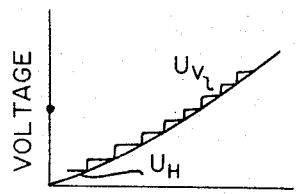
FIG. 2
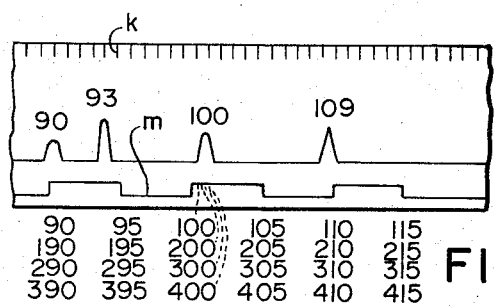
FIG. 3
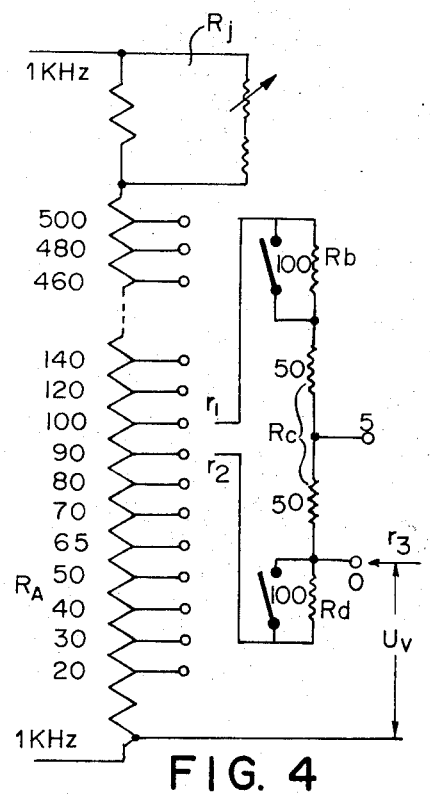
FIG. 4
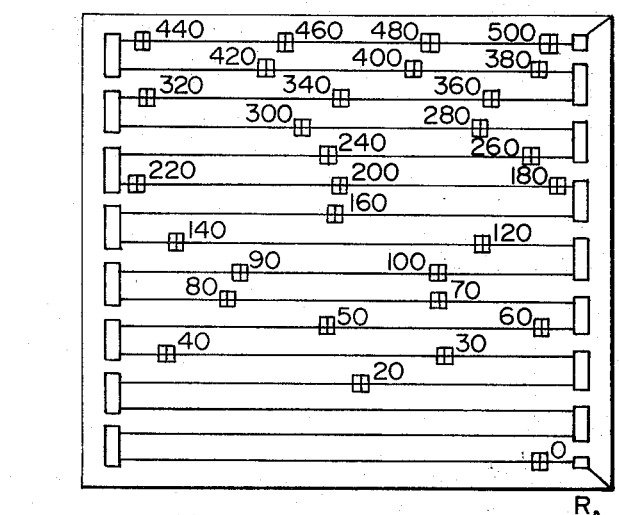
FIG. 5
FIG. 6
INVENTOR.
KURT KRONENBERGER
BY
Wolf, Greenfield + Hicken
ATTORNEYS Sept. 19, 1967  K. KRONENBERGER  3,342,991
HALL PROBE FOR MEASURING THE INTENSITY OF A
CHANGING MAGNETIC FIELD IN
A MASS SPECTROMETER
Filed Nov. 24, 1964  2 Sheets-Sheet 2

United States Patent Office 3,342,991
Patented Sept. 19, 1967

3,342,991
HALL PROBE FOR MEASURING THE INTENSITY OF A CHANGING MAGNETIC FIELD IN A MASS SPECTROMETER
Kurt Kronenberger, Parkstrasse 28, Bremen, Germany
Filed Nov. 24, 1964, Ser. No. 413,538
Claims priority, application Germany, Nov. 27, 1963, A 44,648
5 Claims. (Cl. 250—41.9)

The invention relates to methods and arrangements for magnetic field measurement, for mass marking in mass spectrometers, in which the mass separation is performed by deflection in a magnetic field, and the mass ranging by magnetic field alterations.

In such arrangements it is desirable to measure the magnetic field strength so accurately that the mass number can be found unambiguously from the field strength.

It is an object of the invention to provide a method and an arrangement for accurate magnetic field measurement.

It is a further object of the invention to provide an arrangement for the accurate measurement of magnetic field strength, in which a differential potential is formed from the Hall potential of a Hall generator arranged in a gap of the mass separation magnet of a mass spectrometer and a comparison potential which is proportional to the energising current of the Hall generator and which is taken from a standard resistance sub-divided in a step like manner, this difference potential being used on reaching a predetermined value for switching the comparison potential to a next value and indicating the magnetic field strength or the mass number in question at the instant of the said switching.

These and other objects and advantages of the invention will be clear from the following description, given with reference to the accompanying drawings, which are given by way of example and in which:

FIG. 1 is a block circuit diagram of an arrangement for mass marking in a mass spectrometer;

FIG. 2 is a diagram for explaining the manner of operation of the arrangement according to FIG. 1;

FIG. 3 is an example of a mass marking on a recording strip effected by an arrangement according to FIG. 1;

FIG. 4 is a circuit diagram showing the construction of a comparison resistance of the arrangement illustrated in FIG. 1;

FIG. 5 is a plan view of the comparison resistance of FIG. 4 showing the construction and the arrangement of tappings thereof;

FIG. 6 is a plan view showing the position of a Hall probe of the arrangement according to FIG. 1 in the field of a separation magnet of the mass spectrometer;

Figure 7:
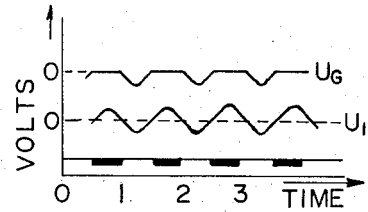
FIGS. 7 and 8 are graphs for explaining the manner of operation of the arrangement according to FIG. 1.

The mass marking arrangement for a mass spectrometer, illustrated in principle in FIG. 1, uses a Hall generator as a sensing element. A 1 kHz. generator $a$, supplies the voltages $U_1$ and $U_2$ from the secondary winding of a transformer $b$. A voltage $U_v$ that is a fraction of the voltage $U_1$ is taken from a stepped comparison resistance $R_v$. The Hall generator $c$ which is disposed in the gap of the separating magnet in the mass spectrometer (see FIG. 6) generates the Hall voltage $U_H$ as a function of the magnetic field strength.

The difference $U_v - U_H$ is connected to the input of an amplifier $d$.

The Hall probe $c$ provides a Hall A-C potential between the vertically aligned pair of electrodes $c_1$ and $c_2$ in response to the magnetic field in the mass spectrometer separating magnetic gap perpendicular to the plane of the Hall probe $c$ and the A-C current flowing between the horizontally aligned electrodes $c_3$ and $c_4$ in response to the A-C voltage provided by the secondary winding $U_2$. The probe $c$ measures Hall effect which is the development of a transverse electric potential gradient in a current-carrying conductor (or semi-conductor) placed in a magnetic field when the conductor is positioned so that the direction of the magnetic field is perpendicular to the direction of current flow. A phase sensitive detector $f$ connected to the output of the amplifier supplies a positive voltage if the difference $U_v - U_H$ is negative, that is to say if the phase reverses. As a result of the high amplification, this occurs immediately after the null transition, that is to say when $U_v - H_H = 0$ (see FIG. 2). A trigger stage $g$ is provided which switches a relay servo system $h$ by one step further, whenever a positive voltage occurs at the output of the phase rectifier. Thus, the comparison resistance $R_v$ is brought into the next position and the comparison voltage $U_v$ is increased so that $U_v - U_H$ again assumes a positive value. As the value $U_H$ grows, this procedure is repeated so that the comparison voltage $U_v$ follows a step curve (see FIG. 2). The stepping procedure is simultaneously indicated by a marking pen $i$ on a chart or by a recording galvanometer on a light spot recorder.

The tappings of the stepped resistance $R_v$ are empirically adjusted to the desired marking points. Before taking a spectrum, one point, for example a point representing the mass number, is set with the aid of an adjusting resistance $R_j$. Small fluctuations of the ion acceleration voltage or the like can thus be compensated.

The measuring range extends from mass number 20 to 500, the associated field strengths amounting to about 1700 to 8500 gauss. For marking, a rectangular curve $m$ is traced on the recording strip $k$ of the mass spectrum, as shown in FIG. 3, its upward jumps, e.g. lying at values ending in whole decades and its downward jumps lying at mass numbers ending in 5. The mass scale is linearly interpolated between the mass points ending in 5. The mass values 100, 200, 300, 400, are separately characterised (see FIG. 3) by a second stroke after the upward jump, each with different spacings depending on magnitude. For mass marking with jumps representative of units, the upward jumps are allocated for example to the even mass numbers and the downward jumps to the odd mass numbers.

Referring to FIG. 4, there is shown a preferred specific form of the resistance designated $R_v$ in FIG. 1 and the variable resistance connected in series between secondary winding $U_1$ and the top of $R_v$. The series combination of these resistances receive the 1 kHz. signal provided by the secondary winding $U_1$ to provide the comparison voltage $U_v$ in accordance with the setting of the voltage divider and the series variable resistance that may be used for calibration to produce a given maximum value of $U_v$ corresponding to the full voltage across voltage divider $R_v$.

The comparison resistance $R_v$, as shown in FIG. 4, consists of two parts, namely a part $R_A$ with coarse steps which are allocated to the mass numbers 20, 30 . . . 100, 120, 140 . . . 500, and a part $R_B$ with fine steps corresponding to the mass number differences 0, 5, 10, 15. The contacts $r_1$, $r_2$ and $r_3$ are connected to the coarse and fine steps of the resistance $R_A$ and $R_B$ by means of relays which are not shown in the drawings and which are actuated by the servo system $h$.

In the example of FIG. 4, the resistance setting is illustrated for the moment in which the ray deflection of the mass spectrometer is between the mass numbers 94 and 95. When the peak center of the mass number 95 is reached at the ion interceptor of the spectrometer, the fine contact $r_3$ is moved into the next position and the comparison voltage $U_v$ is increased by one fine step.

FIG. 5 shows the construction and the arrangement of the steps of the divider $R_A$ of the comparison resistance. This resistance consists of manganin rods (temperature coefficient $10^{-5}/°$ C.) disposed in a rectangular shape and which are provided with threads. The steps corresponding to the mass numbers 20, 30, 40 . . . 90, 100, 120 . . . 480, 500 are formed by the line connections to the relays, which connections are clamped by means of nuts and are therefore adjustable.

The divider $R_A$ is arranged so that all the rods are in series. That is to say, the full resistance is developed between the square terminal in the lower right hand corner and the square terminal in the upper right hand corner. The vertically staggered contacts in the left column and right column interconnect the ends of adjacent rods so that all the rods are connected in series. By threading the rods in the preferred manner, each of the nuts associated with a given one of the indicated mass numbers may be rotated to displace it horizontally until the resistance between that nut and the electrode represented by the square in the lower right hand corner is such as to establish a voltage $U_v$ corresponding to that mass number. Thus, exact calibration is facilitated regardless of the resistance characteristics of the different rods.

A precision probe with low temperature coefficient for the Hall voltage and low temperature coefficient for its internal control resistance is used as the Hall probe. As shown in FIG. 7, the probe is disposed in a housing $r$ through which water flows. The water temperature (about 50° C.) is stabilised by a thermostat to $\pm 0.1°$ C. An electric thermostat arrangement would be unsuitable as a result of the stray magnetic field of its heating winding. FIG. 6 shows the disposition of the Hall probe $c$ in the field of the separating magnet $s$ adjacent to the separating tube $t$ of the mass spectrometer. The probe is positioned so far into the magnetic field that small changes in position have no appreciable influence.

Figure 10:
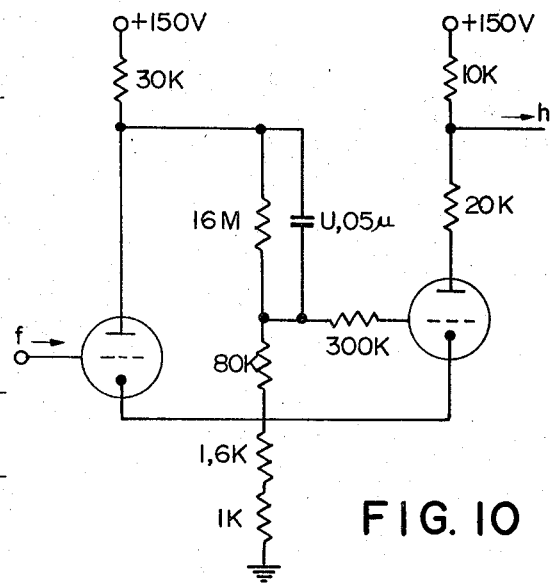
FIG. 10 is a circuit diagram of a trigger stage provided in combination with the phase rectifier of FIG. 9 for triggering a controllable multi-vibrator for the further switching of a comparison voltage.

The difference voltage $U_v - U_H$ (see FIG. 1) is amplified with the aid of the amplifier $d$ by about 400,000 times and is rectified by a gated phase sensitive detector $f$ operating without filtering shown in FIG. 10. This prevents any influence on the measuring speed by filtering means of the phase sensitive detector. If the generator voltage $U_0$ and the amplifier output voltage $U_1$ are such that the positive half wave falls in the blocking phase, then in accordance with FIG. 8 the gated output voltage $U_G$ consists of negative half waves and the following trigger stage does not respond, the opposite being the case for FIG. 8.

If the gated output half waves of the phase sensitive detector are positive, the trigger stage $g$ illustrated in FIG. 10 is triggered. Accordingly, the control multivibrator $h$ is triggered, and the relay servo system advances the comparison voltage $U_v$ by one step. By means of a delay member (not shown), the trigger stage $g$ is inhibited during a time period of about 0.05 second. Only upon expiration of this inhibiting period can another step advance occur. This inhibiting protects the relay servo system from disturbing pulses which may arise during the stepping of the comparison resistance $R_v$.

Each stage of the coarse resistance $R_A$ and the fine resistance $R_B$ has a relay with a plurality of contacts allocated thereto. This relay is switched by means of a control relay which is actuated by the trigger and the multi-vibrator. By means of diodes connected in parallel with the relay windings, a sufficient delay in opening of the preceding relay is achieved, so that a preparatory contact of each relay remains closed until a self holding contact has closed therefor.

Figure 8:
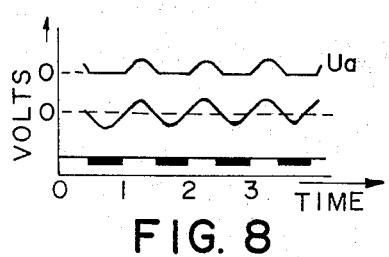
Figure 9:
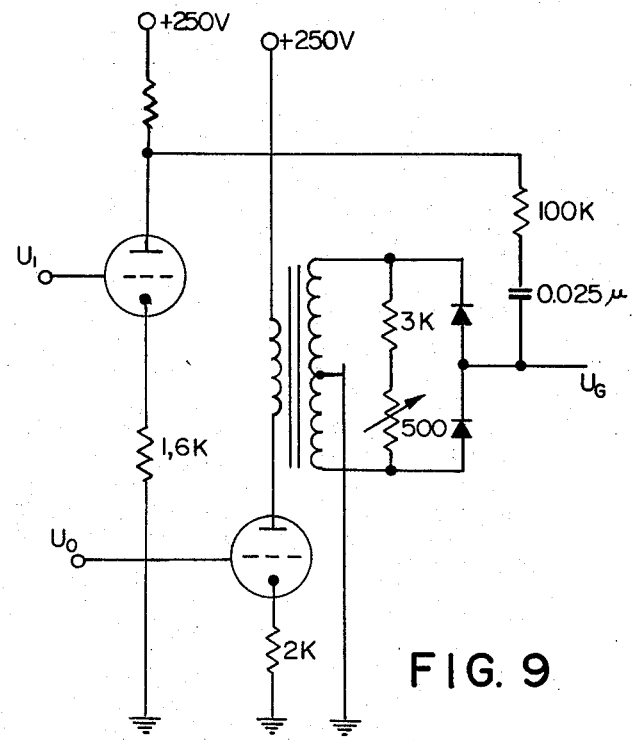
FIG. 9 is a circuit diagram of a phase rectifier used in the arrangement for determining a null transition.

Referring to FIG. 9, there is shown a conventional gated phase sensitive detector that provides the negative $U_G$ pulses of FIG. 7 or the positive $U_G$ pulses of FIG. 8 depending upon the relative phase between the amplifier output voltage $U_1$ and the generator reference voltage $U_0$ as indicated above. Since the circuitry is known and specific parameter values are set forth, those skilled in the art will be able to practice the invention by building the specific circuit, or by using any other suitable phase sensitive detector.

Referring to FIG. 10, there is shown a conventional trigger circuit that responds to the positive impulses $U_G$ shown in FIG. 8 to provide a signal at the output that is directed to multivibrator $h$ as indicated. Since the circuit is known to those skilled in the art and specific parameter values are set forth, those skilled in the art will be able to practice the invention by building that specific circuit or any other known trigger stage.

Figure 11:
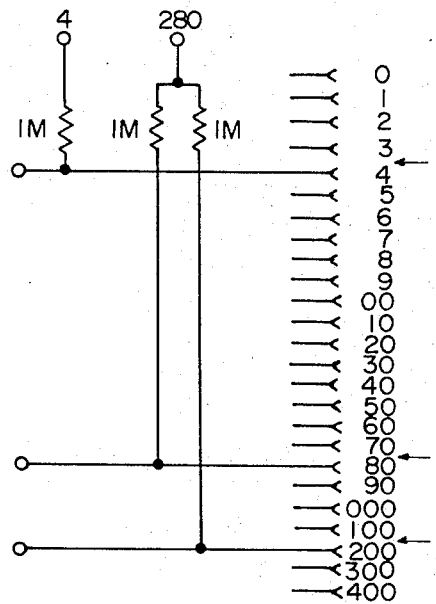
FIG. 11 is a circuit diagram showing a section of a relay chain for switching the comparison resistance.

For mass marking with unit steps, the possibility exists of connecting a mass printer. FIG. 11 shows a circuit of part of a resistance matrix (shown for mass unit 284) for digitally obtaining the mass number. The corresponding channels of a Hewlett-Packard printer are connected without intermediate members to the connection terminals of the resistance matrix.

In the matrixing arrangement illustrated, the potential $U_v$ is the sum of a hundreds potential, a tens potential and a units potential selected by hundreds, tens and units arms, respectively, whose positions designate corresponding decimal digits that may be used to activate a conventional decimal digital printer.

I claim:
1. Mass spectrometric apparatus for determining the mass number from the magnetic field strength in the gap of the separation magnet of a mass spectrometer in which mass separation is effected by deflection in said magnetic field and the mass ranging by continuous alteration of said magnetic field comprising,
   said mass separation magnet,
   means defining a Hall probe in said magnetic field,
   a source of an A-C signal,
   means coupled to said source for applying an A-C signal of predetermined amplitude provided by said source to said Hall probe to establish a current therein for coacting with said magnetic field to develop a Hall A-C potential representative of said magnetic field strength in synchronism with said A-C signal from said source,
   steppable attenuating means coupled to said A-C signal source for providing a comparison A-C signal with magnitude selectively changeable in stepwise increments,
   means for comparing said comparison signal with said Hall A-C potential which potential is representative of the mass number then determinable to provide a trigger signal when the magnitudes of said comparison A-C signal and said Hall A-C potential bear a predetermined relationship,
   and stepping means responsive to the occurrence of each of said trigger signals for changing the attenuation imparted by said steppable attenuating means to change said comparison signal by one of said stepwise increments.
2. Apparatus in accordance with claim 1 wherein said apparatus includes means for establishing the occurrence of each of said trigger signals upon the occurrence of a predetermined change in the continuous alteration of said magnetic field whereby the occurrence of each trigger signal corresponds to the apparatus then sensing a predetermined known mass number.
3. Apparatus in accordance with claim 1 and further comprising transformer means having a primary wind- ing receiving A-C energy from said A-C source, at least a first secondary winding for providing A-C energy to said steppable attenuating means and at least a second secondary winding for providing said A-C signal of predetermined amplitude, and said means for comparing comprises, means for coupling said first secondary winding in series with the Hall probe electrodes bearing said Hall A-C potential to provide a difference A-C signal, and phase sensitive detecting means responsive to a predetermined phase reversal in said difference A-C signal relative to the phase of said A-C signal provided by said source for providing a said trigger signal.

4. Apparatus in accordance with claim 3 wherein said apparatus includes means for establishing the occurrence of each of said trigger signals upon the occurrence of a predetermined change in the continuous alteration of said magnetic field whereby the occurrence of each trigger signal corresponds to the apparatus then sensing a predetermined known mass number.

5. Apparatus in accordance with claim 4 wherein said means for establishing comprises a tapped resistance comprising said attenuating means with each tap corresponding to a said predetermined known mass number.

References Cited

UNITED STATES PATENTS

| 2,378,936 | 6/1945 | Langmuir | 250—41.93 |
| 2,562,120 | 7/1951 | Pearson | 324—45 |
| 2,837,653 | 6/1958 | Craig et al. | 250—41.93 |
| 2,906,945 | 9/1959 | Weiss | 324—45 |
| 2,959,733 | 11/1960 | Koch et al. | 324—45 |

RALPH G. NILSON, *Primary Examiner.*

W. F. LINDQUIST, *Assistant Examiner.*